United States Patent [19]

Kriechbaum

[11] 3,995,198
[45] Nov. 30, 1976

[54] HIGH VOLTAGE CIRCUIT BREAKER

[75] Inventor: Karl Kriechbaum, Kassel-K., Germany

[73] Assignee: Licentia Patent-Verwaltungs-G.m.b.H., Frankfurt am Main, Germany

[22] Filed: Oct. 28, 1975

[21] Appl. No.: 626,499

Related U.S. Application Data

[63] Continuation-in-part of Ser. No. 469,906, May 14, 1974.

[30] Foreign Application Priority Data

| Oct. 26, 1974 | Germany | 2451011 |
| May 14, 1973 | Germany | 2324321 |
| Aug. 30, 1973 | Germany | 2343758 |
| Jan. 23, 1974 | Germany | 2403117 |
| Oct. 22, 1975 | Germany | 2547244 |

[52] U.S. Cl. .................... 317/11 A; 317/11 C
[51] Int. Cl.² .............................. H02H 7/22
[58] Field of Search ........... 317/11 A, 11 C, 11 E, 317/11 R, 16, 20, 50; 200/144 AP, 145, 146

[56] References Cited
UNITED STATES PATENTS

| 2,885,514 | 5/1959 | Thommen | 317/11 E X |
| 3,500,009 | 3/1970 | Bell | 317/11 C X |
| 3,538,277 | 11/1970 | Phillips | 317/11 A X |
| 3,538,278 | 11/1970 | Rathbun | 317/11 A X |
| 3,566,152 | 2/1971 | Casey et al. | 317/11 A X |
| 3,657,607 | 4/1972 | Knauer | 317/11 C |

FOREIGN PATENTS OR APPLICATIONS

| 1,086,701 | 8/1954 | France | 200/145 |

Primary Examiner—J D Miller
Assistant Examiner—Patrick R. Salce
Attorney, Agent, or Firm—Spencer & Kaye

[57] ABSTRACT

In a high voltage circuit breaker arranged to be connected in series with a conductor for breaking the flow of current through the conductor, the breaker including at least two identical breaks, capacitors shunting all of the breaks for producing a voltage gradient, at least one resistor connected in shunt with at least one of the breaks, and a switch connected with the resistor and arranged to be operated in a manner such that it does not make or interrupt a current, the operation of the switch is controlled by a control device connected for operating the switch and a current transformer connected to the control device and arranged for monitoring the current flow through the conductor to provide an output which causes, during a break operation of the circuit breaker, the closing of the switch shortly before the simultaneous opening of all of the breaks only when the current through the conductor exceeds a certain value.

2 Claims, 2 Drawing Figures

HIGH VOLTAGE CIRCUIT BREAKER

CROSS-REFERENCE TO RELATED APPLICATION

This is a continuation-in-part of copending application Ser. No. 469,906, filed May 14, 1974.

BACKGROUND OF THE INVENTION

The invention relates to a high voltage circuit breaker having at least two breaks, or gaps, all of which are shunted with capacitors for creating a voltage gradient and a part of which is additionally shunted with a resistor and a switch connected in series, being controlled in such a way that the switch does not make or interrupt a current.

SUMMARY OF THE INVENTION

It is an object of the present invention, to control the resistor-switch which is series connected with shunting resistors in such a manner that its closing is actuated only when the value of the current exceeds a definite value.

According to the invention, the circuit breaker is characterised in that, for controlling the switch, a control device is arranged, which is connected with a current transformer monitoring the current flowing through the main line and which causes, during a breaking operation of the circuit breaker, the closing of the switch shortly before the simultaneous opening of all identically designed breaks only when a certain current value is exceeded.

BRIEF DESCRIPTION OF THE DRAWING

For a better understanding of the invention, reference may be had to the following description taken in conjunction with the accompanying drawing, wherein.

DESCRIPTION OF THE PREFERRED EMBODIMENTS

Figure 1:
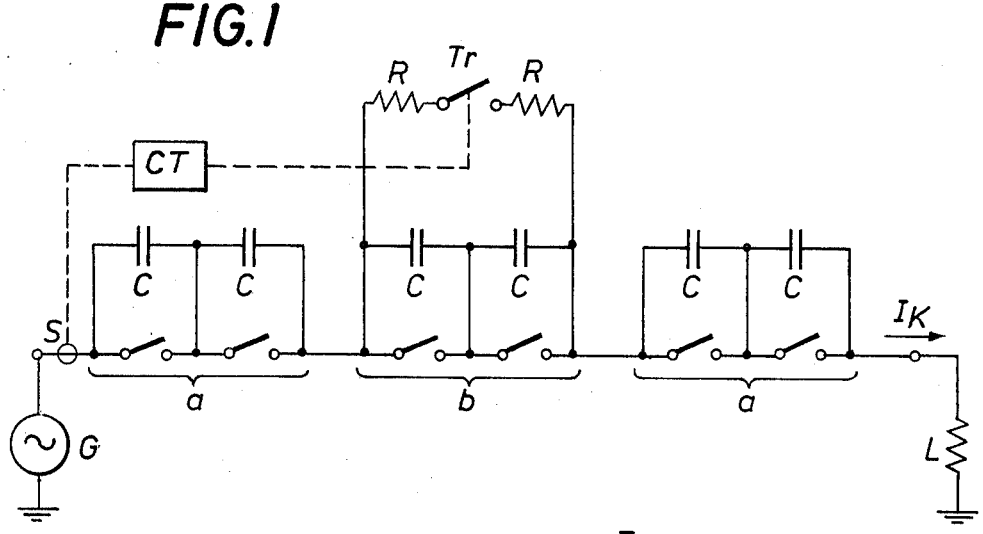
FIG. 1 is a schematic illustration of a circuit breaker embodying one form of my invention. The circuit breaker is shown in the open position.

In FIG. 1, the breaks, or gaps, or switching poles, bridged only by capacitors C are indicated by $a$, and the breaks bridged additionally by resistors R are indicated by $b$. The capacitors C in parallel with the breaks $a$ and $b$ serve for the equal partition of the test voltages and the transient voltage. The switch Tr is series-connected with the parallel resistors R. The operation of the switch Tr is controlled by a control device CT, which is effected via a current transformer S by the current $I_K$ flowing through the circuit breaker.

The circuit breaker has one terminal connected to a generator G representing in this figure the source side of a network, and has the other terminal connected to a load L representing the line side of the circuit breaker.

The opening operation works in two different manners.

In the case of a load interruption or the interruption of short circuit currents of lower values, all equal breaks $a$ and $b$ will be opened simultaneously and break the current. The switch Tr does not close, it stays in its open position, as the current is too low to operate the control device. In the case of a short circuit current of a higher value, at first the switch Tr will be closed without a current by the control device CT and by this the breaks $b$ are bridged by the low-ohmic resistances R. The value of such a resistance R is some ten ohms. The control device CT, and therefore the switch Tr, only operate if the short-circuit current $I_K$, measured by the current transformer S exceeds a limit valve $I_{K\ max}$. After the closing of the switch Tr, the breaks $a$ and $b$ as described above, will be opened simultaneously. The short-circuit current shifts to the low-ohmic resistances R. If now a break-down occurs across the breaks, a current flows with a value limited by the resistances R. This current with reduced amplitude will be finally switched off by the breaks $a$ after a time of a quarter of a period after the first passage of the alternating current through its zero value. The recovery-voltage of the breaks $a$ is now strongly damped. After the interruption of the current, the switch Tr will be opened without current flow.

As described, the switch TR is operated in dependance on the current $I_K$ only if the current to be interrupted exceeds a value $I_{K\ max}$.

The control device CT gives the advantage that the switch remains opened in those situations in which the circuit breaker is stressed by relative low currents, but high voltages, occuring for instance with the so-called phase-opposition. By this, also the breaks bridged with the resistances R, but with the switch Tr open, can carry a part of the recovery voltage. The decision whether a fault current with low value caused by a phase-opposition will actuate the switch is made by the control device CT.

Figure 2:
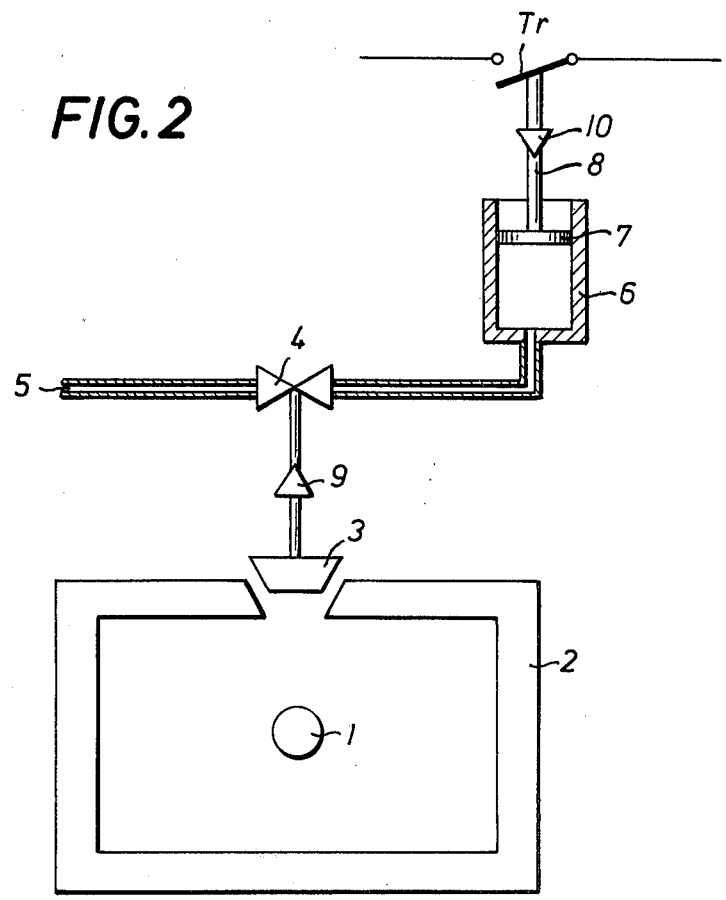
FIG. 2 is a plan view of one embodiment of the control device employed in the circuit of FIG. 1.

Referring now to FIG. 2, there is schematically shown an arrangement including the control device. Here the main line 1 which is carrying the current $I_K$ is surrounded with a magnet core 2, having a movable anchor arm 3. If the current exceeds a limit $I_{K\ max}$, which can be adjusted by a spring 9, the movable anchor arm is attracted and thus opens a mechanically connected valve 4. Compressed air from a line 5 enters a cylinder 6 and actuates a piston 7 and the movable contact of the switch Tr, which is linked to the piston by a rod 8. For reopening the switch Tr after interruption of the current $I_K$, a spring 10 is connected with the rod 8.

I claim:

1. In a high voltage circuit breaker arranged to be connected in series with a conductor and having at least two identical breaks, capacitors shunting all of the breaks for producing a voltage gradient, resistor means connected in shunt with at least one of the breaks, and a switch connected in series with the resistor means and arranged to be operated in a manner such that it does not make or interrupt a current, the improvement comprising control means connected for operating said switch and a current transformer connected to said control means and arranged for monitoring the current flowing through the conductor to provide an output which causes, during a breaking operation of said circuit breaker, the closing of said switch shortly before the simultaneous opening of all said breaks only when the current through the conductor exceeds a certain value.

2. A high voltage circuit breaker as defined in claim 1 wherein said current transformer comprises a magnet core arranged to surround the conductor and having a movable anchor arm providing the output of said transformer, and said control means comprise an air valve mechanically linked to said core and situated in a high pressure air line, a working cylinder containing a piston mechanically linked to said switch, and an air line connected between said valve and the interior of said cylinder for supplying air under pressure to said cylinder when said valve is open.

* * * * *